(12) United States Patent
Lee

(10) Patent No.: US 10,892,818 B2
(45) Date of Patent: Jan. 12, 2021

(54) SYSTEM, APPARATUS AND METHOD FOR MANAGING SATELLITE OPERATION SERVICE

(71) Applicant: CONTEC CO., LTD., Daejeon (KR)

(72) Inventor: Sunghee Lee, Sejong-si (KR)

(73) Assignee: CONTEC CO., LTD., Daejeon (KR)

( * ) Notice: Subject to any disclaimer, the term of this patent is extended or adjusted under 35 U.S.C. 154(b) by 0 days.

(21) Appl. No.: 16/834,050

(22) Filed: Mar. 30, 2020

(65) Prior Publication Data

US 2020/0358522 A1 Nov. 12, 2020

Related U.S. Application Data

(63) Continuation of application No. PCT/KR2019/005500, filed on May 8, 2019.

(30) Foreign Application Priority Data

May 7, 2019 (KR) .......................... 10-2019-0053137

(51) Int. Cl.
*H04B 7/185* (2006.01)

(52) U.S. Cl.
CPC ..... *H04B 7/18519* (2013.01); *H04B 7/18513* (2013.01)

(58) Field of Classification Search
CPC ............ H04B 7/18519; H04B 7/18523; H04B 7/18528; H04B 7/185–195; H04B 7/14–216; H04B 7/18513; H04L 12/14; H04W 48/20

See application file for complete search history.

(56) References Cited

U.S. PATENT DOCUMENTS

| | | | | |
|---|---|---|---|---|
| 5,268,694 A | * | 12/1993 | Jan ........................ | H04B 7/2041 342/354 |
| 5,488,640 A | * | 1/1996 | Redden .............. | H04B 7/18558 370/325 |
| 5,673,256 A | * | 9/1997 | Maine ................ | H04B 7/18567 370/271 |

(Continued)

FOREIGN PATENT DOCUMENTS

| | | |
|---|---|---|
| JP | 2001-358634 A | 12/2001 |
| JP | 2010-274671 A | 12/2010 |

(Continued)

OTHER PUBLICATIONS

U.S. Appl. No. 62/744,048, filed 2018.*

(Continued)

*Primary Examiner* — Dung B Huynh
(74) *Attorney, Agent, or Firm* — Studebaker & Brackett PC

(57) ABSTRACT

Provided are a satellite operation service management system, a satellite operation service management apparatus, and a satellite operation service management method, and the satellite operation service management apparatus may include a ground station manager configured to generate a control signal for a space ground station based on the space ground station to be used for control of an artificial satellite and a time slot to be used by the space ground station; and a communicator configured to transmit the control signal to the space ground station to be used.

20 Claims, 10 Drawing Sheets

(56) References Cited

U.S. PATENT DOCUMENTS

| | | | | |
|---|---|---|---|---|
| 5,777,577 A * | 7/1998 | Kumar | H04B 7/18539 | 342/352 |
| 5,838,668 A * | 11/1998 | Okada | H04B 7/18523 | 370/312 |
| 6,118,999 A * | 9/2000 | Moraes | H04B 7/18539 | 455/13.1 |
| 6,125,261 A * | 9/2000 | Anselmo | H04B 7/18578 | 370/316 |
| 6,292,473 B1 * | 9/2001 | Duske, Jr. | H04B 7/18567 | 370/316 |
| 6,328,264 B1 * | 12/2001 | Maeda | B64G 1/242 | 244/158.4 |
| 6,370,126 B1 * | 4/2002 | De Baere | H04B 7/1856 | 370/316 |
| 6,418,312 B1 * | 7/2002 | Cutler | H04B 7/18539 | 455/12.1 |
| 6,434,397 B1 * | 8/2002 | Hazama | H04B 7/18558 | 455/450 |
| 6,535,716 B1 * | 3/2003 | Reichman | H04B 7/18586 | 370/345 |
| 6,539,217 B1 * | 3/2003 | Syed | H04B 7/18567 | 455/406 |
| 6,625,450 B1 * | 9/2003 | Munoz-Garcia | H04B 7/18539 | 455/11.1 |
| 6,690,934 B1 * | 2/2004 | Conrad, Jr. | H04B 7/18519 | 455/427 |
| 6,850,497 B1 * | 2/2005 | Sigler | H04B 7/1853 | 370/310 |
| 8,203,947 B1 * | 6/2012 | Sarkar | H04W 72/1247 | 370/230 |
| 8,526,941 B2 * | 9/2013 | Tseytlin | H04B 7/18591 | 455/427 |
| 8,818,446 B2 * | 8/2014 | Ben Laish | H04B 7/18519 | 455/522 |
| 8,908,591 B2 * | 12/2014 | Luyks | H04W 48/20 | 370/316 |
| 9,628,395 B1 * | 4/2017 | Teller | H04L 43/0894 | |
| 9,960,837 B1 * | 5/2018 | Coleman | H04L 67/18 | |
| 10,659,148 B2 * | 5/2020 | Trutna | H04B 7/18513 | |
| 2002/0021677 A1 * | 2/2002 | Kita | H04B 7/18513 | 370/321 |
| 2003/0037134 A1 * | 2/2003 | Hickman | H04B 7/1851 | 709/223 |
| 2003/0081587 A1 * | 5/2003 | Ichiyoshi | H04B 7/18582 | 370/345 |
| 2003/0081631 A1 * | 5/2003 | Liu | H04N 21/4347 | 370/468 |
| 2004/0137842 A1 * | 7/2004 | Iwata | H04B 7/18541 | 455/12.1 |
| 2004/0198346 A1 * | 10/2004 | Swensen | H04B 7/18506 | 455/431 |
| 2005/0012661 A1 * | 1/2005 | Halivaara | G01S 19/256 | 342/357.395 |
| 2005/0136832 A1 * | 6/2005 | Spreizer | H04B 7/18567 | 455/3.02 |
| 2006/0046715 A1 * | 3/2006 | Burgemeister | G08G 5/0013 | 455/431 |
| 2006/0165113 A1 * | 7/2006 | Nonoyama | H04B 7/18506 | 370/442 |
| 2007/0220100 A1 * | 9/2007 | Rosenberg | H04L 67/12 | 709/206 |
| 2008/0049649 A1 * | 2/2008 | Kozisek | H04L 45/3065 | 370/310 |
| 2008/0151820 A1 * | 6/2008 | Solis | H04W 74/04 | 370/329 |
| 2008/0151913 A1 * | 6/2008 | El-Damhougy | H04B 7/18584 | 370/401 |
| 2008/0159419 A1 * | 7/2008 | Smith | H04W 56/0045 | 375/260 |
| 2008/0165840 A1 * | 7/2008 | Morris | H04B 7/18595 | 375/227 |
| 2008/0232286 A1 * | 9/2008 | Habetha | H04W 52/0216 | 370/311 |
| 2010/0103870 A1 * | 4/2010 | Garcia-Luna-Aceves | H04W 40/02 | 370/328 |
| 2010/0172328 A1 * | 7/2010 | McGuffin | H04B 7/18506 | 370/332 |
| 2010/0284325 A1 * | 11/2010 | Yabo | H04B 7/18582 | 370/322 |
| 2010/0289342 A1 * | 11/2010 | Maness | H02J 50/90 | 307/104 |
| 2011/0028147 A1 * | 2/2011 | Calderhead, Jr. | H04B 7/18506 | 455/431 |
| 2011/0286325 A1 * | 11/2011 | Jalali | H04B 7/18589 | 370/221 |
| 2012/0197552 A1 * | 8/2012 | Robinson | H04Q 9/00 | 702/50 |
| 2013/0094481 A1 * | 4/2013 | Jeong | H04L 23/02 | 370/336 |
| 2013/0136055 A1 * | 5/2013 | Youssefzadeh | H04B 7/2048 | 370/324 |
| 2013/0329630 A1 * | 12/2013 | Becker | H04W 56/0015 | 370/326 |
| 2014/0017992 A1 * | 1/2014 | Bigras | H04B 7/18519 | 455/12.1 |
| 2014/0099884 A1 * | 4/2014 | Lozano | H04B 7/18578 | 455/12.1 |
| 2015/0003236 A1 * | 1/2015 | Tsuda | H04W 48/06 | 370/229 |
| 2015/0200809 A1 * | 7/2015 | Wittenschlaeger | H04L 41/0806 | 370/401 |
| 2015/0237569 A1 * | 8/2015 | Jalali | H04B 7/18506 | 370/326 |
| 2016/0081121 A1 * | 3/2016 | Lim | H04W 74/085 | 370/242 |
| 2016/0183213 A1 * | 6/2016 | Ratiney | H04B 7/2684 | 370/350 |
| 2016/0365918 A1 * | 12/2016 | Hosotani | H04W 72/0406 | |
| 2017/0192095 A1 * | 7/2017 | Jobanputra | H04B 7/185 | |
| 2018/0083741 A1 * | 3/2018 | Motoyoshi | H04B 7/18513 | |
| 2018/0160433 A1 * | 6/2018 | Kim | H04B 7/18504 | |
| 2018/0220411 A1 * | 8/2018 | Si | H04L 1/1812 | |
| 2019/0090147 A1 * | 3/2019 | Durvasula | H04B 17/309 | |
| 2019/0239082 A1 * | 8/2019 | Ravishankar | H04B 7/18528 | |
| 2020/0007224 A1 * | 1/2020 | Hawthorne | H04W 72/0446 | |
| 2020/0007227 A1 * | 1/2020 | Becker | H04B 17/309 | |
| 2020/0024012 A1 * | 1/2020 | Fortezza | G01S 19/27 | |
| 2020/0028575 A1 * | 1/2020 | Buer | H04B 7/2041 | |
| 2020/0119807 A1 * | 4/2020 | Whitefield | H04B 7/18517 | |
| 2020/0187101 A1 * | 6/2020 | Shibuta | H04M 1/72502 | |
| 2020/0244346 A1 * | 7/2020 | Goettle | H04W 88/16 | |

FOREIGN PATENT DOCUMENTS

| | | |
|---|---|---|
| JP | 2014-172553 A | 9/2014 |
| KR | 10-2013-0007220 A | 1/2013 |
| KR | 10-2019-0022236 A | 3/2019 |

OTHER PUBLICATIONS

"Task allocation strategies for cooperative task planning of multi-autonomous satellite constellation" by Feng Yao et al. (Year: 2018).*

International Search Report issued in PCT/KR2019/005500; dated Feb. 5, 2020.

Notification of Reason for Refusal issued to KR Application No. 10-2019-0053137, dated Jun. 20, 2019.

Notice of Decision to Grant a Patent issued to KR Application No. 10-2019-0053137, dated Aug. 7, 2019.

* cited by examiner

FIG. 5

| Time | First space ground station | Second space ground station | Third space ground station |
|---|---|---|---|
| 00:00 ~ 01:00 | | | T30 |
| 01:00 ~ 02:00 | | | T31 |
| 02:00 ~ 03:00 | | | T32 |
| ... | ... | ... | ... |
| 12:00 ~ 13:00 | | T21 | |
| 13:00 ~ 14:00 | | T22 | |
| 14:00 ~ 15:00 | | T23 | |
| 15:00 ~ 16:00 | | T24 | |
| 16:00 ~ 17:00 | T10 | | |
| ... | ... | ... | ... |
| 21:00 ~ 22:00 | T11 | | |
| 22:00 ~ 23:00 | T12 | | |
| 23:00 ~ 24:00 | T13 | | |

| Time | D0 | D1 | D2 | D3 | D4 |
|---|---|---|---|---|---|
| ⋮ | ⋮ | ⋮ | ⋮ | ⋮ | ⋮ |
| 12:00 ~ 13:00 | ⋮ | ⋮ | ⋮ | ⋮ | ⋮ |
| 13:00 ~ 14:00 | ⋮ | ⋮ | T40 | T43 | ⋮ |
| 14:00 ~ 15:00 | ⋮ | T50 | T41 | | ⋮ |
| 15:00 ~ 16:00 | ⋮ | T51 | T42/T52 | T54 | ⋮ |
| 16:00 ~ 17:00 | ⋮ | | T53 | T55 | ⋮ |
| ⋮ | ⋮ | ⋮ | ⋮ | ⋮ | ⋮ |

SYSTEM, APPARATUS AND METHOD FOR MANAGING SATELLITE OPERATION SERVICE

CROSS-REFERENCE TO RELATED APPLICATION

The present application is a continuation of International Patent Application No. PCT/KR2019/005500, filed on May 8, 2019, which is based upon and claims the benefit of priority to Korean Patent Application No. 10-2019-0053137, filed on May 7, 2019, in the Korean Intellectual Property Office (KIPO). The disclosures of the above-listed applications are hereby incorporated by reference herein in their entirety.

BACKGROUND

1. Field

At least one example embodiment relates to a satellite operation service management system, a satellite operation service management apparatus, and a satellite operation service management method.

2. Description of Related Art

An artificial satellite refers to an object that may fly in a predetermined circle or an elliptical orbit around the earth. The artificial satellite may be mounted on a launch vehicle and then fired to enter a predetermined orbit in the space and to perform a variety of predefined operations in the orbit. The artificial satellite functions to exchange data with other ground-based communication/electronic devices (e.g., satellite antennas and set-top boxes connected thereto) and/or to observe the ground surface while orbiting the earth.

To control, for example, monitor the artificial satellite or the launch vehicle and to receive data gathered by the artificial satellite, a space ground station is installed on the ground. The space ground station may communicate with the artificial satellite based on a standardized frequency and communication protocol, may transmit a control signal for a specific operation (e.g., photographing) to the artificial satellite and/or receive data (e.g., image data on the ground surface) acquired by the artificial satellite based on the specific operation, and may perform a variety of processing based on the received data.

Currently, about 1,600 artificial satellites are orbiting the earth and a number of artificial satellites around the earth are expected to increase as a space market is evolved from government-led development to private-led development.

SUMMARY

At least one example embodiment provides a satellite operation service management system, a satellite operation service management apparatus, and a satellite operation service management method that enable a user to acquire data from a launch vehicle or a satellite at a desired point in time or position.

At least one example embodiment also provides a satellite operation service management system, a satellite operation service management apparatus, and a satellite operation service management method that may select and/or manage a satellite and a space ground station.

According to an aspect of at least one example embodiment, there is provided a satellite operation service management system, a satellite operation service management apparatus, and a satellite operation service management method.

The satellite operation service management apparatus may include a ground station manager configured to generate a control signal for a space ground station based on the space ground station to be used for control of an artificial satellite and a time slot to be used by the space ground station; and a communicator configured to transmit the control signal to the space ground station to be used.

The communicator may be configured to transmit, to the terminal, information about a plurality of available space ground stations and time slots of the plurality of available space ground stations.

The ground station manager may be configured to process an existing occupied time slot among the time slots of the plurality of available space ground stations to be non-selectable.

The communicator may be configured to receive, from the terminal, a selection on the space ground station to be used and the time slot to be used by the space ground station, and the ground station manager may be configured to determine the space ground station to be used and the time slot to be used by the space ground station in response to the selection.

The ground station manager may be configured to determine whether the space ground station to be used is operable, and to select another space ground station to replace the space ground station to be used in response to inoperability of the space ground station to be used.

The other space ground station may be configured to transmit a control signal for an operation of the artificial satellite or a satellite data transmission request signal to the artificial satellite.

The satellite operation service management apparatus may further include a satellite data processing configured to process satellite data received from the space ground station.

The satellite operation service management apparatus may further include a biller configured to perform at least one of calculation, billing, and payment for system use cost.

The satellite operation service management system may include at least one space ground station configured to communicate with at least one artificial satellite; a terminal configured to input a space ground station to be used among the at least one space ground station and a time slot to be used by the space ground station; and a management apparatus configured to receive the space ground station to be used and the time slot from the terminal, and to generate a control signal for the space ground station to be used based on the space ground station to be used and the time slot.

The satellite operation service management method may include determining a space ground station to be used for control of an artificial satellite and a time slot to be used by the space ground station; generating a control signal for the space ground station based on the space ground station to be used and the time slot to be used by the space ground station; and transmitting the control signal to the space ground station to be used.

The satellite operation service management method may further include transmitting, to the terminal, information about a plurality of available space ground stations and time slots of the plurality of available space ground stations.

An existing occupied time slot among the time slots of the plurality of available space ground stations may be processed to be non-selectable.

The satellite operation service management method may further include receiving, from the terminal, a selection on the space ground station to be used and the time slot to be used by the space ground station.

The satellite operation service management method may further include determining whether the space ground station to be used is operable; and selecting another space ground station to replace the space ground station to be used in response to inoperability of the space ground station to be used.

The satellite operation service management method may further include transmitting a control signal for an operation of the artificial satellite or a satellite data transmission request signal to the artificial satellite.

The satellite operation service management method may further include transmitting satellite data received from the space ground station to the terminal.

The satellite operation service management method may further include performing at least one of calculation, billing, and payment for system use cost after transmitting the satellite data.

According to the aforementioned satellite operation service management system, satellite operation service management apparatus, and satellite operation service management method, a user may acquire data gathered by a launch vehicle or a satellite at a desired point in time and position and accordingly, a user customized satellite data management service may be constructed.

According to the aforementioned satellite operation service management system, satellite operation service management apparatus, and satellite operation service management method, it is possible to select and/or manage a satellite and a space ground station to receive data in response to a selection from a user or automatically.

According to the aforementioned satellite operation service management system, satellite operation service management apparatus, and satellite operation service management method, a user may acquire desired data at a desired point in time regardless of occurrence of a malfunction of a satellite or a space ground station by monitoring and controlling a state of the satellite or the space ground station remotely.

According to the aforementioned satellite operation service management system, satellite operation service management apparatus, and satellite operation service management method, a user may acquire data gathered by a satellite based on a web and accordingly, user convenience may be improved.

Other features and aspects will be apparent from the following detailed description, the drawings, and the claims.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 5 illustrates a first example of describing a time slot of a space ground station and a selection on a specific time slot according to an example embodiment.

FIG. 7 illustrates a second example of describing a time slot of a space ground station and a selection on a specific time slot according to an example embodiment.

DETAILED DESCRIPTION

Figure 1:
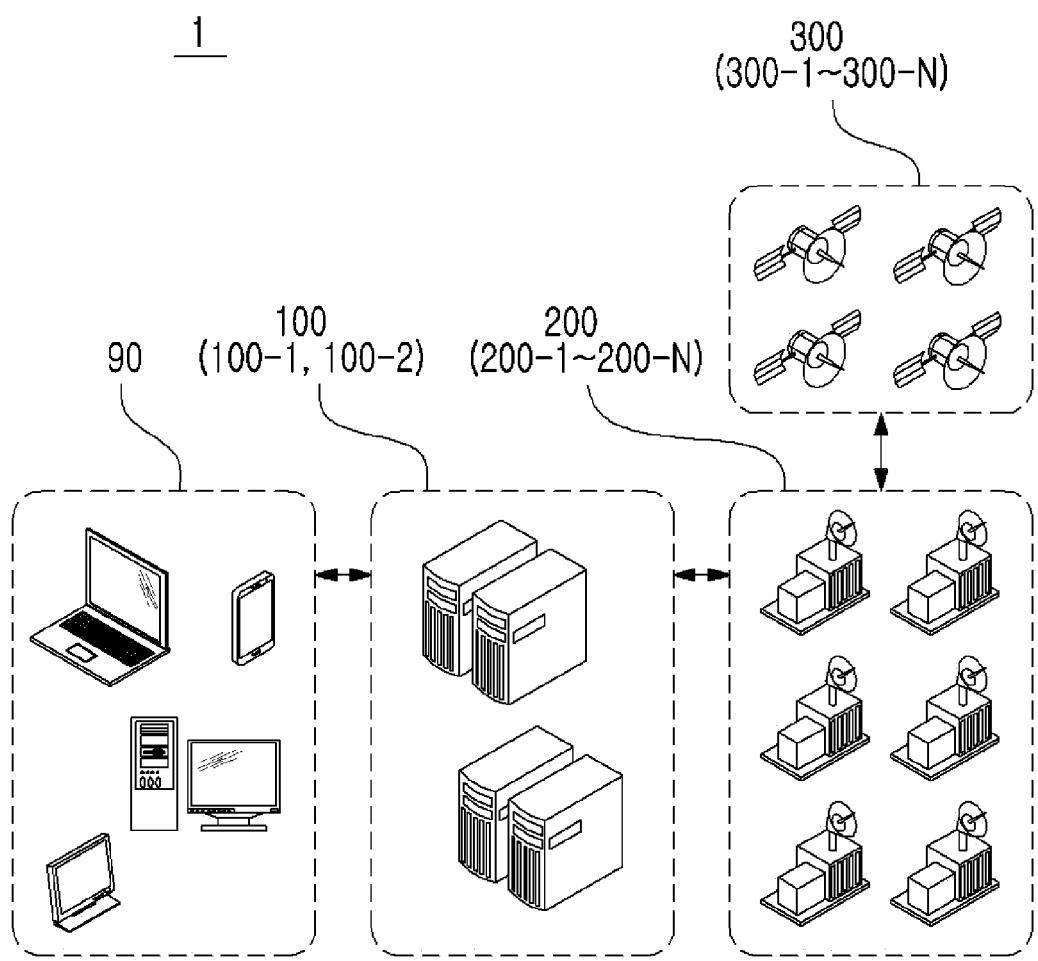
FIG. 1 illustrates an example of a satellite operation service management system according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of example embodiments, detailed description of well-known related structures or functions will be omitted when it is deemed that such description will cause ambiguous interpretation of the present disclosure.

The following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure.

Unless the context clearly indicates otherwise, like reference numerals refer to like elements used throughout. Also, components used herein, such as, for example, terms '-unit/module', etc., may be implemented as software and/or hardware. Depending on example embodiments, each component with '-unit/module', etc., may be implemented as a single piece of software, hardware and/or a desired part, and also may be implemented as a plurality of pieces of software, hardware, and/or desired parts.

When it is described that a single portion is connected to another portion throughout the present specification, it may indicate that a single portion is physically connected or electrically connected to to the other portion. Also, when a single portion is described to include the other portion, it may include still another portion instead of excluding still other portion, unless the context clearly indicates otherwise.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component. As used herein, the term "and/or" includes any and all combinations of one or more of the associated listed items.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the related art, and are not to be interpreted in an idealized or overly formal sense unless expressly so defined herein.

Hereinafter, a satellite operation service management apparatus and a satellite operation service management system according to example embodiments are described with reference to FIGS. 1 to 9.

FIG. 1 illustrates an example of a satellite operation service management system according to an example embodiment.

Referring to FIG. 1, a satellite operation service management system 1 may include at least one terminal 90, a management apparatus 100 configured to communicably connect to the at least one terminal 90, at least one space ground station 200 (200-1 to 200-N) configured to communicably connect to the management apparatus 100, and at least one artificial satellite 300 (300-1 to 300-M) configured to communicably connect to the at least one space ground station 200 (200-1 to 200-N). Here, each of N and M denotes a natural number greater than or equal to 1.

The terminal 90 may refer to a device configured to receive at least one of an instruction, a command, and information from a user, and to output and provide data requested by the user.

For example, the user may acquire information about at least one artificial satellite 300 the user desires to access among at least one artificial satellite 300, that is, a first artificial satellite 300-1 to an M-th artificial satellite 300-M (hereinafter, also referred to as the artificial satellites 300-1 to 300-M). In this case, the received information may include identification information of the artificial satellites 300-1 to 300-M, orbit information of the artificial satellites 300-1 to 300-M, and trajectory information of launch vehicles to which the artificial satellites 300-1 to 300-M are mounted.

As another example, the user may acquire a command/information about a selection on a single ground station 200 among a plurality of space ground stations 200, that is, a first space ground station 200-1 to an N-th ground station 200-1 to 200-N (hereinafter, also referred to as the space ground stations 200-1 to 200-N). In this case, the command/information about the selection on the single space ground station 200 may include a command/information about a selection on at least one time slot (e.g., T23 and T24 of FIG. 5, T50, T51, T52, T53, T54, and T55 of FIG. 7) among time slots (e.g., T10, ..., T11, T12, and T13, T21, T22, T23, and T24, and T30, T31, and T32 of FIG. 5, T40, T41, and T42 and T50, T51, T52, T53, T54, and T55 of FIG. 7) of the single space ground station 200.

As another example, the terminal 90 may provide data forwarded from the management apparatus 100 to the user in a visual, tactile, and/or auditory manner. In detail, for example, the terminal 90 may display information (e.g., an identification number, a position, or an operation state) about at least one of the selected space ground station 200 and the artificial satellite 300, information about a time slot of the at least one space ground station 200, data or information (hereinafter, referred to as satellite data) gathered and acquired by the artificial satellite 300, information about a service use cost, and an interface for payment, a webpage for displaying such information, and various types of characteristics, symbols, or images (videos or still images) included therein, and/or other data or information provided from the management apparatus 100 to the user.

According to an example embodiment, the terminal 90 may receive a command/instruction/information/data from the user and/or may output data forwarded from the management apparatus 100 to the user using an existing web browser. Accordingly, the user may receive a command or information associated with a selection on at least one of the space ground station 200 and the artificial satellite 300 and/or may verify data gathered by the artificial satellite 300.

Also, according to another example embodiment, the terminal 90 may receive a command or data and/or may output data gathered by the artificial satellite 300 using a specially designed separate application (e.g., an interface application). In this case, the separate application may be received from the management apparatus 100 and then installed on the terminal 90 in response to a selection from the user or in a predetermined manner.

The terminal 90 may be specially designed for use of the satellite operation service management apparatus 100, or may be a predetermined electronic device. The electronic device may include at least one of, for example, a smartphone, a tablet personal computer (PC), a head mounted display (HMD) device, a smart watch, a laptop computer, a desktop computer, a digital television, a set-top box, a navigation device, an artificial intelligence speaker, a portable game device, a personal digital assistant (PDA), an electronic copy board, an electronic billboard, an electronic device, and/or various electronic devices capable of performing input of a symbol or output in visual/auditory output of data.

The terminal 90 may communication with the management apparatus 100 over a predetermined network. Here, the network may include a wired communication network, a wireless communication network, or a combination thereof. Here, the wired communication network may be constructed using a cable. The cable may be implemented using, for example, a pair cable, a coaxial cable, an optical fiber cable, and an Ethernet cable. The wireless communication network may be implemented using at least one of a near field communication network and a long distance communication network. Here, the near field communication network may be implemented using, for example, wireless fidelity (WiFi), ZigBee, Bluetooth, WiFi direct, Bluetooth low energy (BLE), control area network (CAN) communication, and near field communication (NFC). The long distance communication network may be implemented based on a wired communication network, for example, a mobile communication standard such as 3rd Generation Partnership Project (3GPP), 3GPP2, and Worldwide Interoperability for Microwave Access (WiMAX). Also, the terminal 90 may use a private network for information security and may also use a virtual private network (VPN).

The terminal 90 may communicate with the management apparatus 100 using various types of communication protocols. Here, the communication protocols may include a protocol generally used for communication or transmission and reception of data, such as, for example, transmission control protocol (TCP)/Internet protocol (IP), user datagram protocol (UDP), file transfer protocol (FTP), simple file transfer protocol (SFTP), file transfer protocol secure (FTPS) and/or Gopher.

The management apparatus 100 may perform operation processing, control, and/or communication required to manage satellite data. For example, the management apparatus 100 may also receive information about the space ground station 200 or the artificial satellite 300 from the terminal 90 through communication with the terminal 90. Also, through communication with selected at least one space ground station 200 (at least one of 200-1 to 200-N), the management apparatus 100 may transmit a control signal for an operation of at least one space ground station 200 (at least one of 200-1 to 200-N) and/or may receive data gathered by the artificial satellite 300 (300-1 to 300-M) from at least one space ground station 200 (200-1 to 200-N) and may transitorily or non-transitorily store the received data or transmit the received data to the terminal 90. Also, the management apparatus 100 may monitor and manage a state of the at least one space ground station 200.

According to an example embodiment, the management apparatus 100 may central-intensively manage a plurality of space ground stations 200. Accordingly, the management apparatus 100 may simultaneously or non-simultaneously transmit a control signal to the plurality of space ground stations 200 to manage the plurality of space ground stations 200, or may simultaneously or non-simultaneously receive data transmitted from the plurality of space ground stations 200.

The management apparatus 100 may be configured using one of information processing devices 100-1 and 100-2, or may be configured using at least two information processing devices 100-1 and 100-2. In the case of using the at least two information processing devices 100-1 and 100-2, each of the information processing device 100-1 and 100-2 may perform the whole or a portion of operations or functions in the same manner or may perform different operations or functions. Here, a single information processing device 100-1 or 100-2 may include, for example, a server computing device, a desktop computer, a laptop computer, and/or a portable terminal, or may include an electronic device specially designed to implement the aforementioned operation.

The management apparatus 100 is further described below.

The at least one space ground station 200 (200-1 to 200-N) is provided to control the at least one artificial satellite 300 (300-1 to 300-M) or to communicate with the at least one artificial satellite 300 (300-1 to 300-M). Also, the at least one space ground station 200 (200-1 to 200-N) is provided to be communicable with the management apparatus 100 over a predetermined network. In this case, the network may be constructed using a wired network, a wireless network, or a combination thereof, which is described above.

The plurality of space ground stations 200 (200-1 to 200-N) may be constructed in a necessary area around the world. In this case, only one of the space ground stations 200-1 to 200-N may be installed in one area. Alternatively, a plurality of space ground stations 200-1 to 200-N may be installed in one area. Also, at least two of the plurality of space ground stations 200-1 to 200-N may be installed at relatively close distance.

Figure 2:
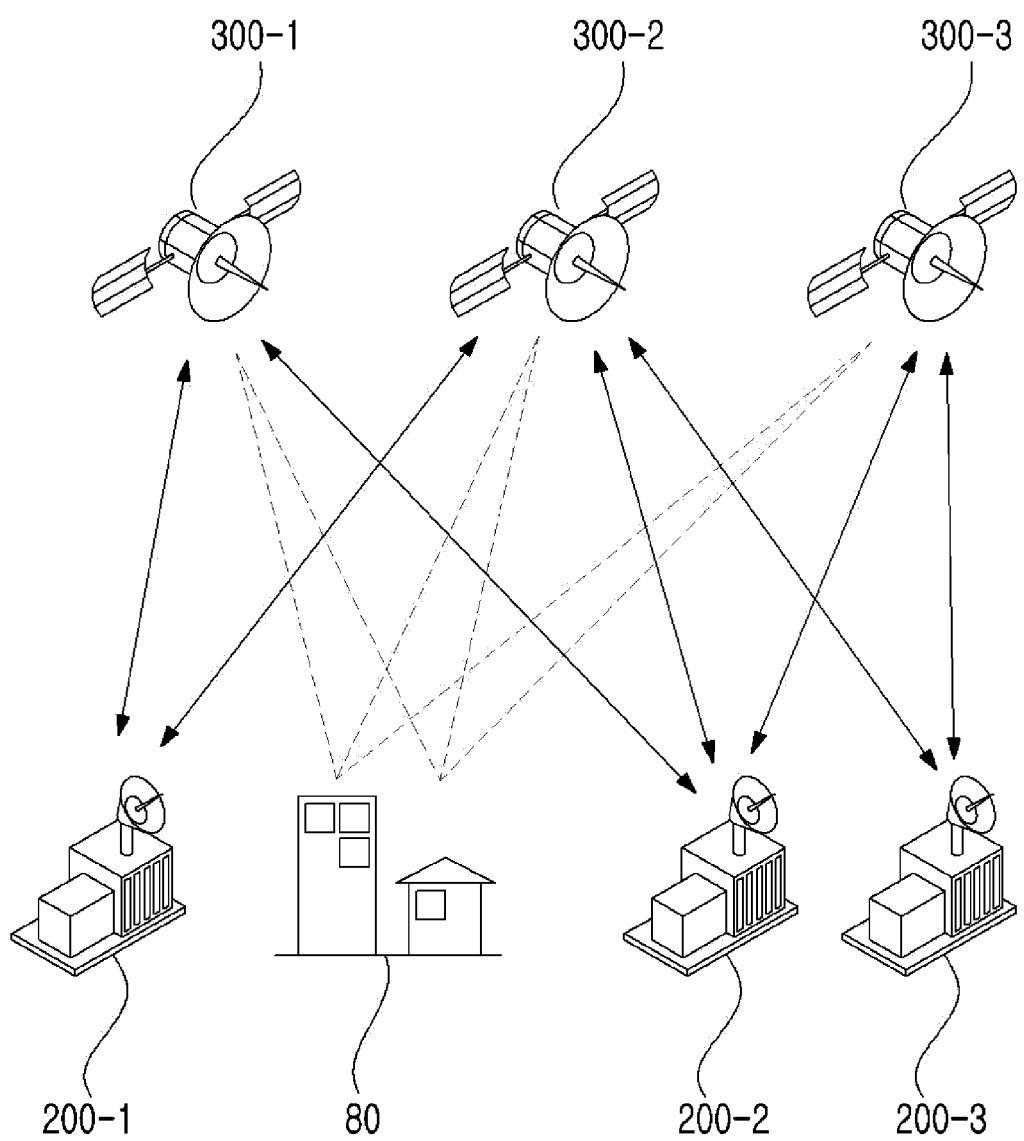
FIG. 2 illustrates an example of an artificial satellite and a space ground station according to an example embodiment.

FIG. 2 illustrates an example of an artificial satellite and space ground station according to an example embodiment.

At least one space ground station 200 (200-1 to 200-N) may be configured to communicate with at least one artificial satellite 300 (300-1 to 300-M) based on a predetermined communication protocol.

According to an example embodiment, one of the space ground stations 200-1 to 200-N may communicate with the plurality of artificial satellites 300-1 to 300-M, and/or the plurality of space ground stations 200-1 to 200-N may communicate with one of the artificial satellites 300-1 to 300-M. For example, referring to FIG. 2, the first space ground station 200-1 may communicably connect to the first artificial satellite 300-1 and the second artificial satellite 300-2 among the first to third artificial satellites 300-1, 300-2, and 300-3 and accordingly, may transmit a control signal to the first artificial satellite 300-1 and the second artificial satellite 300-2, or may receive satellite data from the first artificial satellite 300-1 and the second artificial satellite 300-2. In this case, the first space ground station 200-1 may not communicate with the third artificial satellite 300-3 and accordingly, may not transmit a control signal to or receive data from the third artificial satellite 300-3. Also, the second space ground station 200-2 may communicably connect to the first artificial satellite 300-1, the second artificial satellite 300-2, and the third artificial satellite 300-3, and the third space ground station 200-3 may communicably connect to the second artificial satellite 300-2 and the third artificial satellite 300-3. Accordingly, the first artificial satellite 300-1 may communicate with the first space ground station 200-1 and the second space ground station 200-2, the second artificial satellite 300-2 may communicate with the first space ground station 200-1, the second space ground station 200-2 and the third space ground station 200-3, and the third artificial satellite 300-3 may communicate with the second space ground station 200-2 and the third space ground station 200-3. Relations between the first to third space ground stations 200-1 to 200-3 and the first to third artificial satellites 300-1 to 300-3 of FIG. 2 are provided as an example only. In addition thereto, the first to third space ground stations 200-1 to 200-3 and the first to third artificial satellites 300-1 to 300-3 may be communicably interconnected through a variety of methods.

Depending on example embodiments, specific at least one space ground station 200 (200-1 to 200-N) may be configured to communicate only specific at least one artificial satellite 300 (300-1 to 300-M). On the contrary, specific at least one artificial satellite 300 (300-1 to 300-M) may be configured to communicate only with specific at least one space ground station 200 (200-1 to 200-N).

Also, at least one space ground station 200 (200-1 to 200-N) may be designed to communicate with only at least one artificial satellite 300 (300-1 to 300-M) moving in a relatively near distance. That is, at least one space ground station 200 (200-1 to 200-N) corresponding to at least one artificial satellite 300 (300-1 to 300-M) may be determined based on a distance therebetween.

Figure 3:
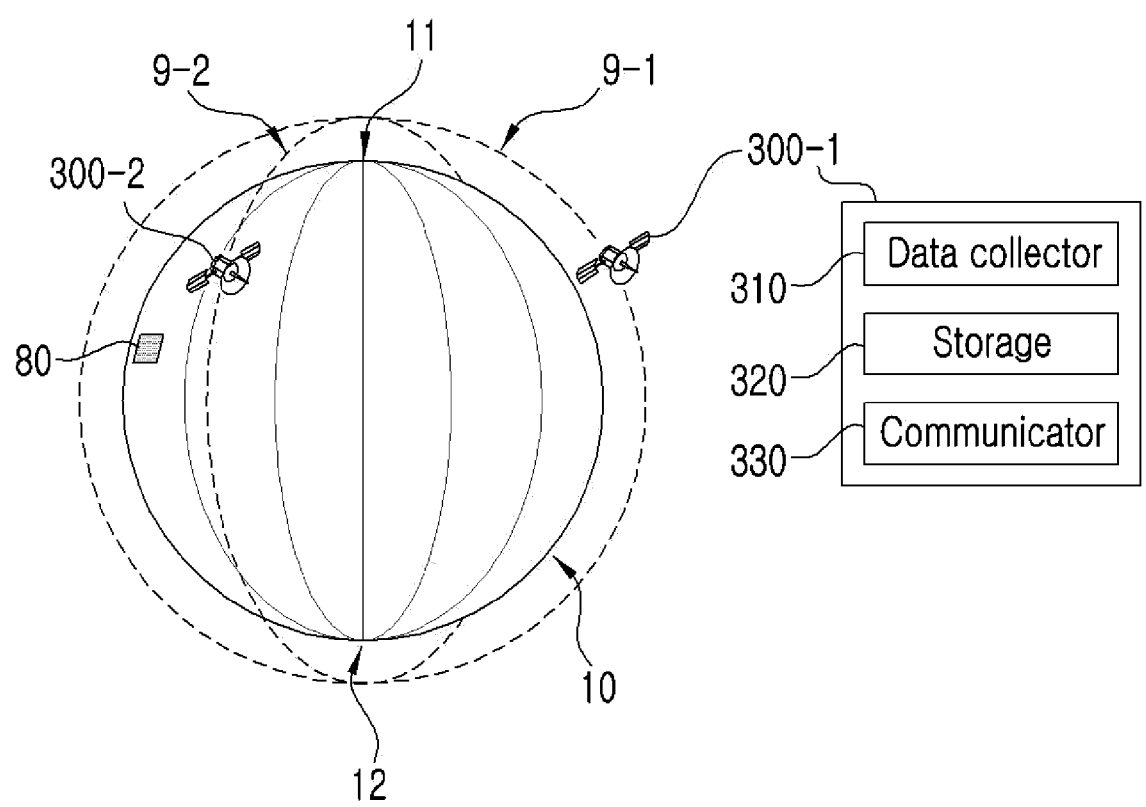
FIG. 3 illustrates an example of describing a movement of an artificial satellite according to an example embodiment.

FIG. 3 illustrates an example of describing a movement of an artificial satellite according to an example embodiment.

Referring to FIG. 3, artificial satellites 300-1 and 300-2 move along the respective corresponding orbits 9-1 and 9-2 formed in the atmosphere of the earth 10. In this case, the orbits 9-1 and 9-2 of the artificial satellites 300-1 and 300-2 may be polar orbits. The polar orbits refer to orbits orthogonal through or around the north pole 11 and the south pole 12. If the artificial satellites 300-1 and 300-2 move along the polar orbits, the rotation of the earth 10 may allow the artificial satellites 300-1 and 300-2 to pass over most of the regions on the earth 10. Therefore, if the artificial satellites 300-1 and 300-2 are equipped with terrestrial photographing equipment, the artificial satellites 300-1 and 300-2 may capture a substantial portion of the ground surface.

According to an example embodiment, the artificial satellite 300-1 may include a data collector 310, a storage 320, and a communicator 330. Here, the storage 320 may be omitted. The data collector 310 may gather data periodically and/or in response to a request from an outside. The data collector 310 may include, for example, a photographing device configured to receive visible light or infrared light transmitted from the ground surface and to acquire image data (e.g., still image data or moving picture data) corresponding to the received visible light or infrared light. In addition, the data collector 310 may include a predetermined device configured to generate a variety of data corresponding to an operation purpose of the artificial satellite 300-1.

The storage 320 may transitorily or non-transitorily store satellite data gathered by the data collector 310. For example, the storage 320 may store image data output in a form of an electrical signal by the photographing device.

The communicator 330 may communicate with at least one space ground station 200 present on the ground based on a predetermined protocol. The artificial satellite 300-1 may receive information about a necessary operation or a control signal from the space ground station 200 and/or may transmit the gathered data to the space ground station 200 through the communicator 330.

Although not illustrated, the artificial satellite 300-1 may further include a processor configured to control an operation or a state (e.g., a posture) or a solar cell configured to acquire energy required for an operation of the artificial satellite 300-1 in addition to the aforementioned components.

According to an example embodiment, the artificial satellite 300-1 may include a small or micro artificial satellite, for example, CubeSat. The CubeSat refers to a micro artificial satellite with a volume of about 10 cm^3 or less and a mass of 1.33 kg or less. The CubeSat is small, light, mountable with a camera, and relatively low-priced for manufacture and launch, however, has a relatively insufficient space to store data. Accordingly, the CubeSat caches data gathered by the data collector 310 in the storage 320 during a short period of time and discards or deletes the data after a predetermined period of time.

Figure 4:
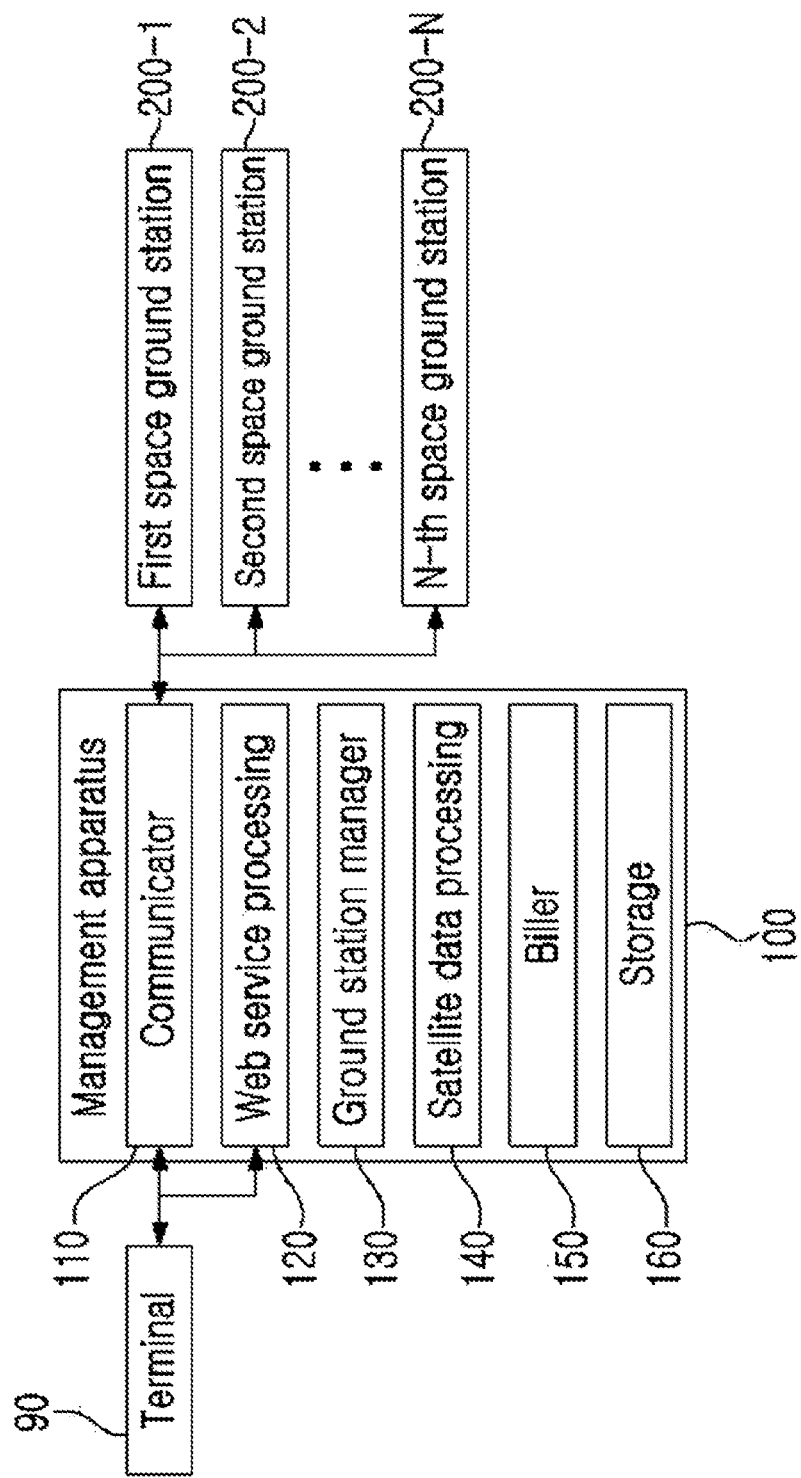
FIG. 4 is a block diagram illustrating an example of a satellite operation service management system and a satellite operation service management apparatus according to an example embodiment.

FIG. 4 is a block diagram illustrating an example of a satellite operation service management system and a satellite operation service management apparatus according to an example embodiment.

Referring to FIG. 4, the management apparatus 100 that is the satellite operation service management apparatus according to an example embodiment may include a communicator 110, a web service processing 120, a ground station manager 130, a satellite data processing 140, a biller 150, and a storage 160. Here, a portion of the components, for example, the web service processing 120 or the biller 150 may be omitted.

The communicator 110 may communicate with at least one of the terminal 90 and at least one space ground station 200 (200-1 to 200-N) based on a predefined communication standard through access to a wired/wireless communication network. The communicator 110 may be configured using a communication chip, an amplifier, and/or an antenna or a communication cable coupling terminal according to an access network.

The web service processing 120 may transmit, to the terminal 90, a user interface for receiving an instruction, a command, or data from a user and/or providing the user with data received from the artificial satellite 300 (300-1 to 300-M) or the space ground station 200 (200-1 to 200-N). The user interface may be displayed for the user through a web browser application. The web service processing 120 may perform a variety of information processing required to manage the user interface or to provide data. For example, in response to a request from the terminal 90, the web service processing 120 may transmit data related to the space ground station 200 or the artificial satellite 300 to the terminal 90. Also, in response to a request from the terminal 90, the web service processing 120 may transmit choice alternatives for selecting a time slot from among time slots of first to N-th space ground stations 200-1 to 200-N to the terminal 90. Here, the choice alternatives may be configured using characters, symbols, numbers, figures, colors, or combinations thereof, and may include, for example, a selection block. The choice alternatives may be displayed for the user through a web browser. The user may select the space ground station 200 and a time slot for acquiring data for the user using the choice alternatives displayed on the web browser. For example, the web service processing 120 may be configured using a web server apparatus.

In response to an input from the user or according to a predetermined setting, the ground station manager 130 may select at least one space ground station 200 from among the first to N-th space ground stations 200-1 to 200-N, may transmit a control signal to the selected at least one space ground station 200-1 to 200-N, and/or may determine a state of the at least one space ground station 200-1 to 200-N based on an electrical signal transmitted from the at least one space ground station 200-1 to 200-N.

In response to a request from the user, the ground station manager 130 may generate task data for at least one space ground station 200-1 to 200-N, or may generate task data for at least one artificial satellite 300-1 to 300-M corresponding to at least one space ground station 200-1 to 200-N. In detail, for example, the ground station manager 130 may generate or set task data of the corresponding space ground station 200 based on information about at least one of the artificial satellite 300 and a launch vehicle forwarded from the user through the terminal 90. Also, if necessary, the ground station manager 130 may store the generated task data in the storage 160. The task data may include content of an operation or a task of the corresponding space ground station 200 (200-1 to 200-N) or artificial satellite 300 (300-1 to 300-M), an execution position thereof, an execution point in time thereof, an execution duration thereof, and/or a variety of information associated with other operations. The execution point in time or the execution duration of the operation or the task may be stored using a time slot of the space ground station 300, The time slot of the space ground station 300 may be selected by the user, which is described below.

The ground station manager 130 may function to manage a time slot of each ground station 200-1 to 200-N. For example, in response to a selection from the user received through the communicator 110, the ground station manager 130 may change at least one time slot among time slots of the respective ground stations 200-1 to 200-N to be occupied, or may cancel an existing registered occupancy, and may generate a control signal for corresponding at least one space ground station 200-1 to 200-N based on a change result. Also, the ground station manager 130 may store a result of changing a time slot of each space ground station 200-1 to 200-N in the storage 160 and may call the stored time slot in response to a request from the user. Accordingly, the ground station manager 130 may provide a current occupancy or reservation state for a time slot of each ground station 200-1 to 200-N to the user in real time through at least one of the communicator 110 and the web service processing 120. Accordingly, the user may verify a selectable time slot and a non-selectable time slot in real time and accordingly, may gather data from the artificial satellite 300.

The ground station manager 130 may generate a control signal for corresponding at least one space ground station 200-1 to 200-N based on content requested from the user through the terminal 90 or content extracted from a task file, and may transmit the generated control signal to the at least one space ground station 200-1 to 200-N at an opportune point in time. In this case, the ground station manager 130 may generate a control signal at a recording point in time in the task file or at an earlier point in time than the recording point in time and may transmit the generated control signal to the corresponding at least one space ground station 200-1 to 200-N.

According to an example embodiment, the ground station manager 130 may select the artificial satellite 300 to perform a task requested from the user. In this case, the artificial satellite 300 communicable with selected at least one space ground station 200-1 to 200-N may be selected. According to another example embodiment, the user may directly select the artificial satellite 300 to perform a task, and the ground station manager 130 may acquire information about the selected artificial satellite 300 through the communicator 110. In this case, the ground station manager 130 may select at least one space ground station 200-1 to 200-N capable of transmitting and receiving data to and from the artificial satellite 300 selected by the user. The selected at least one space ground station 200-1 to 200-N may be provided to the user when the user selects a time slot.

Also, the ground station manager 130 may periodically or aperiodically verify operation states of the space ground stations 200-1 to 200-N. For example, the ground station manager 130 may verify states of the space ground stations 200-1 to 200-N in real time, or may verify states of the space ground stations 200-1 to 200-N before transmitting a control signal. If the space ground stations 200-1 to 200-N are sufficiently operable in response to a control command, the ground station manager 130 may transmit the control signal to the space ground stations 200-1 to 200-N. For example, if the first space ground station 200-1 is unable to or difficult to perform an operation according to a control signal, the ground station manager 130 may select another ground station, for example, the second space ground station 200-2 instead of the incapable first space ground station 200-1 and may transmit the control signal to the newly selected second space ground station 200-2. In this case, similar to the first space ground station 200-1, the newly selected second space ground station 200-2 may control the same satellite, for example, the second artificial satellite 300-2.

In addition, the ground station manager 130 may prepare an operation required to select the space ground station 200 or to generate a control signal for the space ground station 200. Also, the ground station manager 130 may generate a list of accessible space ground stations 200-1 to 200-N, may delete all of or a portion of the space ground stations 200-1 to 200-N included in the list, or may add a new ground station to the list, and may manage an access address of each space ground station 200-1 to 200-N.

The satellite data processing 140 may receive, from at least one space ground station 200-1 to 200-N, satellite data (e.g., an image file captured by each artificial satellite 300) received by the at least one ground station 200-1 to 200-N. If necessary, the satellite data processing 140 may compress or convert the received satellite data, or may modify the satellite data. The data acquired or modified by the satellite data processing 140 may be forwarded to the terminal 90 using the communicator 110 and/or the web service processing 120. Therefore, the user may verify the satellite data.

If necessary, the satellite data processing 140 may store the received satellite data in the storage 160 and may further store the received satellite data in a separate backup device, for example, a backup server. Also, the satellite data processing 140 may store the received satellite data in a cloud storage (which is configurable using, for example, at least one server) such that the user may verify or receive the satellite data without restrictions on a time and an occasion. Here, the cloud storage may be constructed based on a web.

The biller 150 may calculate cost for use (e.g., a service charge) of the satellite operation service management system 1, may request the user for paying the calculated cost, and may receive a payment from the user. The biller 150 may perform calculation, billing, and payment using at least one of various charging methods based on a selection of a designer. For example, the biller 150 may calculate cost based on a size of satellite data received at the satellite data processing 140 or transmitted to the terminal 90, may calculate cost based on traffic occurring during a process of carrying out a request from the user, and/or may calculate cost based on a size or a length of a selected time slot. Also, the biller 150 may calculate cost in real time and may also calculate cost corresponding to a predetermined period of time. In the latter case, the biller 150 may calculate, as cost, an account that is predetermined based on a daily, weekly, or monthly unit. A payment request may be performed every time the user uses the satellite operation service management system 1, or may be performed per a predetermined period, for example, per month.

The web service processing 120, the ground station manager 130, the satellite data processing 140, and the biller 150 may be configured using at least one processor. The processor may include, for example, a central processing unit (CPU), a micro controller unit (MCU), a microprocessor (Micom), an application processor (AP), an electronic controlling unit (ECU), and/or operation/control apparatuses capable of performing various types of operation processing and generating a control signal. Also, the at least one processor may be installed in only a single information processing device, or may be installed in physically separate at least two information processing devices, for example, the information processing devices 100-1 and 100-2.

The web service processing 120, the ground station manager 130, the satellite data processing 140, and the biller 150 may be configured to perform the aforementioned control operation, and accordingly required operation, determination, and/or processing operations by executing an application stored in the storage 160. Here, the application may be generated by a designer and stored in the storage 160, or may be acquired or updated through an electronic software distribution network accessible over a wired or wireless communication network. Depending on example embodiments, the web service processing 120, the ground station manager 130, the satellite data processing 140, and the biller 150 may be processors each in which an embedded application is installed in advance. In this case, the web service processing 120, the ground station manager 130, the satellite data processing 140, and the biller 150 may not call the application from the storage 160.

The storage 160 may store at least one piece of data (e.g., satellite data) acquired by the management apparatus 100 from the space ground station 200. Alternatively, the storage 160 may store a variety of data (e.g., setting values related to an operation) required for an operation of the management apparatus 100, information about the space ground stations 200-1 to 200-N capable of exchanging data with the management apparatus 100, information about the artificial satellite 300, information related to the artificial satellite 300-1, 300-2, etc., such as an orbit or a path thereof, information of the artificial satellite 300-1, 300-2, etc., corresponding to a specific area (80 of FIG. 3), information (an identification symbol or a password) about the user of the terminal 90, an application for the terminal 90 or the management apparatus 100, and/or other required various types of information or applications.

The storage 160 may include, for example, at least one of a main memory and an auxiliary memory. The main memory may be implemented using semiconductor storage media, for example, read only memory (ROM) and random access memory (RAM). Examples of ROM may include typical ROM, erasable programmable read only memory (EPROM), electrically erasable and programable read only memory (EEPROM), and/or mask-ROM. Examples of RAM may include dynamic random access memory (DRAM) and/or static random access memory (SRAM). The auxiliary memory may be implemented using at least one storage media capable of permanently or semi-permanently storing data, such as, for example, a flash memory device, a secure digital (SD) card, a solid state drive (SSD), a hard disc drive (HDD), a magnetic drum, optical media such as DVD, a compact disc (CD), or a laser disc, a magnetic tape, magneto-optical media, and/or floppy disk.

Hereinafter, a process of managing the space ground station 200 and/or the artificial satellite 300 based on the satellite operation service management system 1 is described with reference to FIGS. 5 to 9.

FIG. 5 illustrates a first example of describing a time slot of a space ground station and a selection on a specific time slot according to an example embodiment.

As described above, the user may select an empty time slot from among time slots of the one or more space ground stations 200-1 to 200-N using the terminal 90 and the management apparatus 100.

Referring to FIG. 5, a time slot refers to a time zone allocated to each of the plurality of space ground stations 200-1 to 200-N or a lower time zone included in the allocated use time zone to allow the plurality of space ground stations 200-1 to 200-N to share at least one artificial satellite 300-1 to 300-M. For example, referring to FIG. 2, three space ground stations 200-1, 200-2, and 200-3 may access the second artificial satellite 300-2. In this case, a time zone refers to an accessible time zone of each of the space ground stations 200-1, 200-2, and 200-3 to prevent control collision occurring among the space ground stations 200-1, 200-2, and 200-3. In detail, for example, referring to FIG. 5, the first space ground station 200-1 may be determined to use the second artificial satellite 300-2 in a first time zone (e.g., 16 hours to 24 hours, T10 to T13), the second space ground station 200-2 may be determined use the second artificial satellite 300-2 in a second time zone (e.g., 12 hours to 16 hours, T21 to T24), and the third space ground station 200-3 may be determined to use the second artificial satellite 300-2 in a third time zone (e.g., 0 to 3 hours, T30 to T32).

In response to the user executing an application of the terminal 90 or accessing a website provided from the web service processing 120, the user may verify an available space ground station among the first to third space ground stations 200-1, 200-2, and 200-3 in association with a predetermined artificial satellite, for example, the second artificial satellite 300-2, and may also verify a time slot of the available space ground station. If an image captured in the afternoon (e.g., 12 to 18 hours) for the area 80 is necessary, the second space ground station 200-2 to which a time slot (T2) corresponding to an afternoon time zone is assigned may be selected, and at the same time or sequentially, at least one time slot, for example, T23 and T24, may be selected simultaneously or sequentially from among the time slots T21, T22, T23, and T24 (T2) of the second space ground station 200-2. Depending on circumstances, a portion, for example, the time slot T21, of the time slots T21, T22, T23, and T24 (T2) assigned to the second space ground station 200-2 may be occupied by another user. In this case, the management apparatus 100 may block the user from selecting the occupied time slot T21 or may transmit an error message to the terminal 90 to prevent the user from selecting the time slot T21 occupied by the other user. In response to the user selecting at least one time slot, for example, the time slots T23 and T24, from among the empty time slots T22, T23, and T24 unoccupied by another user, the management apparatus 100 may record the time slots T23 and T24 selected by the user and the second ground station 200-2 corresponding thereto. Accordingly, the user may reserve use of a specific ground station, for example, the second ground station 200-2 in a specific time zone, for example, the time slots T23 and T24. Meanwhile, the management apparatus 100, for example, the ground station manager 130 may prevent duplicate selection by processing the time slots T23 and T24 selected by the user to be non-selectable by another user.

Figure 6:
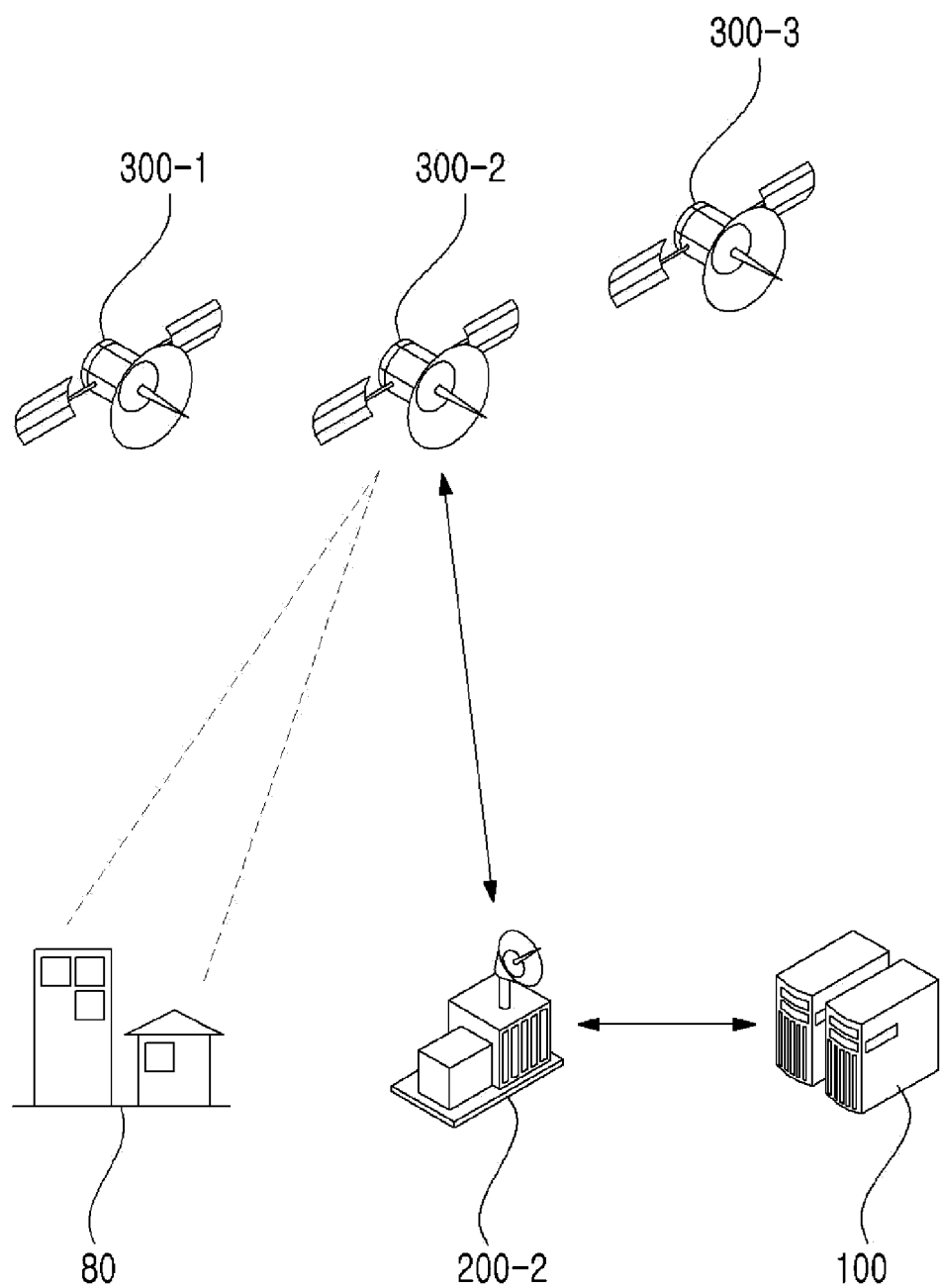
FIG. 6 illustrates an example of describing an operation of an artificial satellite and a space ground station according to an example embodiment.

FIG. 6 illustrates an example of describing an operation of an artificial satellite and a space ground station according to an example embodiment.

Referring to FIGS. 5 and 6, in response to the user selecting the time slots T23 and T24 and inputting a selection result using the terminal 90, the management apparatus 100 may generate a control signal for the selected space ground station, for example, the second space ground station 200-2, at point in times (the same or preceding points in times) corresponding to the selected time slots T23 and T24. At the same time of or before generating the control signal, the user may designate a task (e.g., capturing an image of the specific area 80) to be performed by the artificial satellite 300. Additionally, the user may further designate an artificial satellite, for example, the second artificial satellite 300-2, to perform the task. Meanwhile, the user may not designate the artificial satellite to perform the task. In this case, the management apparatus 100 may determine an optimal artificial satellite, for example, the second artificial satellite 300-2 among the plurality of artificial satellites 300-1, 300-2, and 300-3 based on content of the task to be performed.

Referring to FIG. 6, the management apparatus 100 may transmit a control signal to a selected space ground station, for example, the second space ground station 200-2, at a designated point in time. The second space ground station 200-2 may generate a signal for controlling an artificial satellite, for example, the second artificial satellite 300-2, selected in response to receiving the control signal, and may transmit the control signal to the second artificial satellite 300-2 at a predefined point in time using predetermined radio communication technology. In response to receiving the control signal, the second artificial satellite 300-2 may perform a task in a task execution time, that is, a time corresponding to the time slots T23 and T24. For example, the second artificial satellite 300-2 may acquire satellite image data of the specific area 80 by capturing the specific area 80 once or several times. The satellite image data may be transmitted to the second space ground station 200-2 immediately or if a predetermined period of time is elapsed after the satellite image data is acquired. The second space ground station 200-2 may receive the satellite image data and may forward the received satellite image data to the management apparatus 100. The management apparatus 100 may receive the satellite image data through the communicator 110, and if necessary, may perform processing of a satellite image through the satellite data processing 140 and then transmit the satellite image data to the terminal 90.

FIG. 7 illustrates a second example of describing a time slot of a space ground station and a selection on a specific time slot according to an example embodiment. FIG. 7 illustrates an example of a table showing time slots of a plurality of days D0, D1, D2, D3, and D4 with respect to a specific space ground station, for example, the second space ground station 200-2.

Referring to FIG. 7, the user may select at least one day, for example, days D1, D2, and D3, from among the plurality of days D0, D1, D2, D3, and D4 in addition to a specific day, and may select time slots T50 and T51 for day D1, time slots T52 and T53 for day D2, and time slots T54 and T55 for day D3. In this case, if specific time slots, for example, time slots T40, T41, and T42, or T43 of the specific day D2 or D3 is preselected and occupied by another user, the occupied time slots T40 to T43 may be set and displayed to be unselected by the user. Accordingly, the user may select other time slots, for example, the time slots T52 and T53, aside from the occupied time slots T40 to T43.

In response to the user selecting the time slots T50 to T55 and inputting a selection instruction, the management apparatus 100 may store the selected time slots T50 to T55 and may determine the second space ground station 200-2 to be controlled and a time zone, that is, the time slots T50 to T55 for using the second space ground station 200-2. Also, the management apparatus 100 may process and manage the selected time slots T50 to T55 not to be additionally selected by another user.

Referring to FIG. 6, the management apparatus 100 may generate a control signal based on the time slots T50 to T55 selected by the user and may transmit the generated control signal to the second space ground station 200-2 over a communication network. The second artificial satellite 300-2 and/or the second space ground station 200-2 may operate to meet a request from the user in response to receiving the control signal and may transmit data according to an operation result to the management apparatus 100. Accordingly, the user may select the second space ground station 200-2 and/or the second artificial satellite 300-2 to be used over a several days D1, D2, and D3, may set a time for using the selected second space ground station 200-2 and/or the second artificial satellite 300-2, and may acquire desired satellite data on a desired day and at a desired time.

Figure 8:
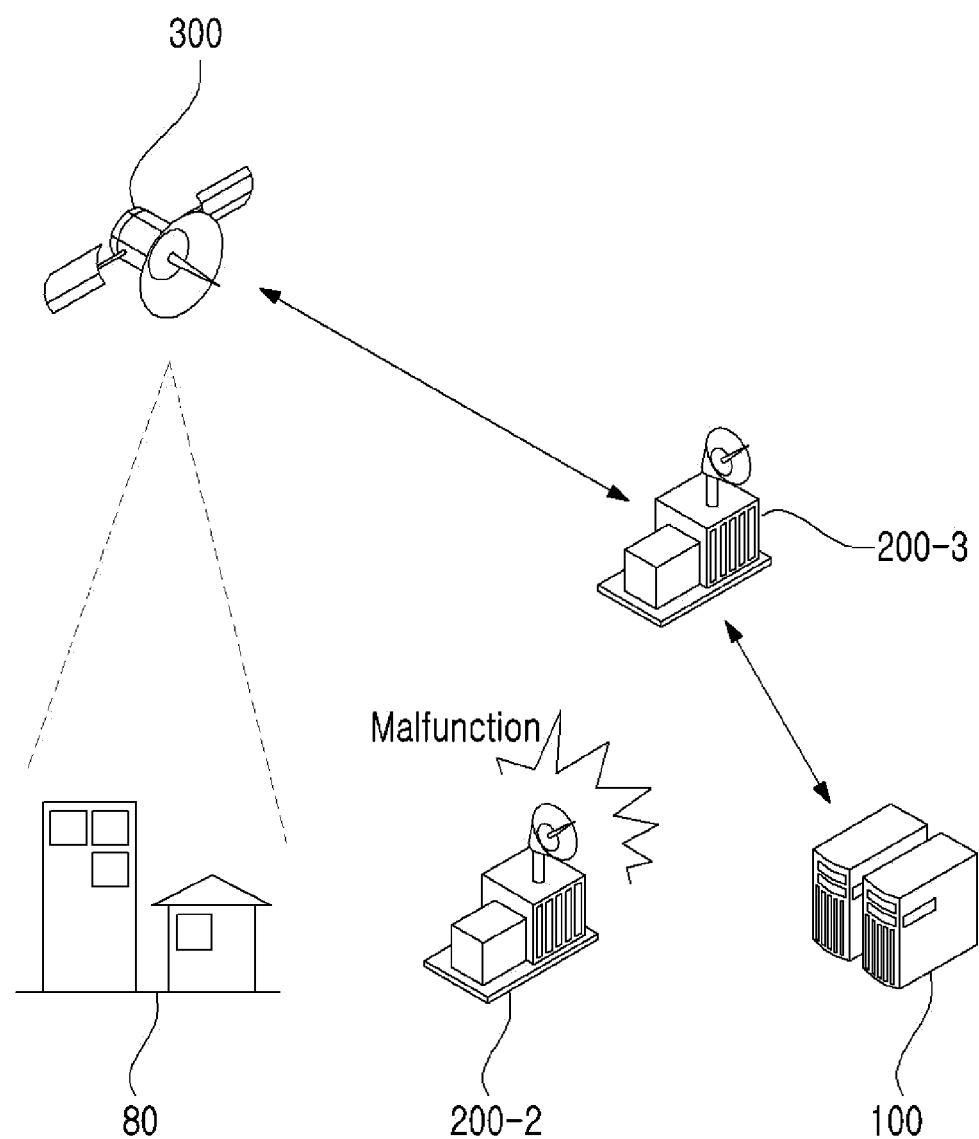
FIG. 8 illustrates another example of describing an operation of an artificial satellite and a space ground station according to an example embodiment.

FIG. 8 illustrates another example of describing an operation of an artificial satellite and a space ground station according to an example embodiment.

Referring to FIG. 8, although the user selects a predetermined space ground station, for example, the second space ground station 200-2, the second space ground station 200-2 may not communicate with the artificial satellite 300 or the management apparatus 100 due to its malfunction, or may not process a control signal forwarded from the management apparatus 100, and/or may not process data received from the artificial satellite 300. The management apparatus 100 may determine whether the second space ground station 200-2 malfunctions by periodically or aperiodically monitoring a state of the second space ground station 200-2 or by particularly verifying the state of the second space ground station 200-2 before transmitting the control signal. When the second space ground station 200-2 is determined to malfunction, the management apparatus 100 may select not the second space ground station 200-2 but another space ground station, for example, the third space ground station 200-3, and may manage the third space ground station 200-3 to perform a task requested by the user, instead of the second space ground station 200-2. In this case, the management apparatus 100 may also transmit, to the user through the terminal 90, a notification indicating that the third space ground station 200-3 replaces the second space ground station 200-2. According to an example embodiment, the selected third space ground station 200-3 may be one of other space ground stations capable of receiving data from the selected artificial satellite 300. For example, the third space ground station 200-3 may include a space ground station along or around an orbit of the artificial satellite 300 or a space ground station most adjacent to or within a distance from the second space ground station 200-2. In response to a selection on the third space ground station 200-3, the management apparatus 100 may transmit a control signal to the selected third space ground station 200-3. In response to receiving the control signal, the third space ground station 200-3 may transmit an artificial satellite control signal corresponding to the control signal to the selected artificial satellite 300. The artificial satellite 300 may perform an operation (e.g., a ground capturing operation) selected at a point in time (e.g., time slots T23, T24, T50 to T55) selected in response to the signal transmitted from the third space ground station 200-3, and may transmit the acquired satellite data to the third space ground station 200-3. The third space ground station 200-3 may receive the satellite data from the artificial satellite 300, and may transmit the received satellite data to the management apparatus 100 by processing or not processing the satellite data. Accordingly, although the second space ground station 200-2 partially malfunctions, the management apparatus 100 may provide the satellite data to the user.

Figure 9:
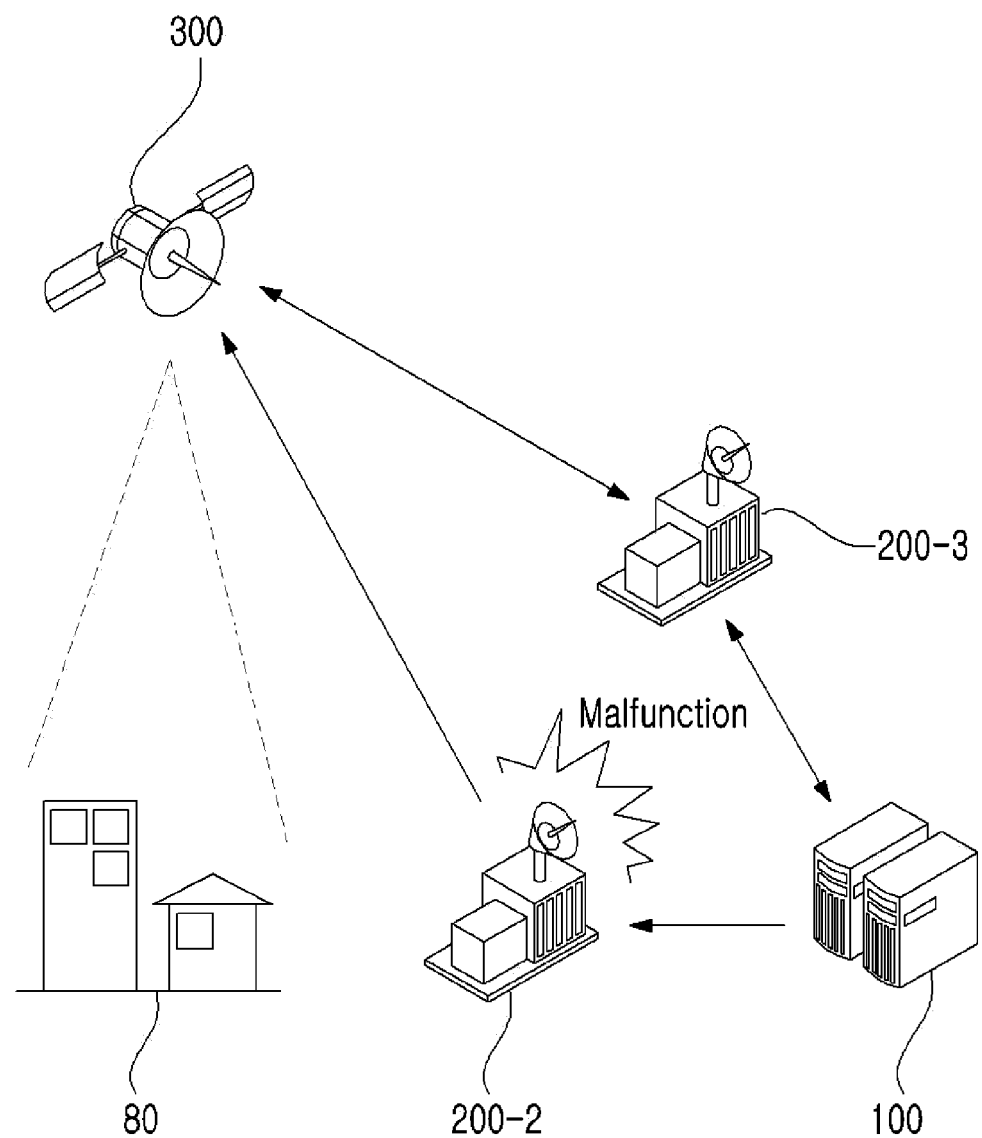
FIG. 9 illustrates still another example of describing an operation of an artificial satellite and a space ground station according to an example embodiment.

FIG. 9 illustrates still another example of describing an operation of an artificial satellite and a space ground station according to an example embodiment.

Referring to FIG. 9, the management apparatus 100 may transmit a control signal a specific space ground station, for example, the second space ground station 200-2, selected in response to a request from the user, and the second space ground station 200-2 may transmit an artificial satellite control signal corresponding to the control signal to the selected artificial satellite 300. The artificial satellite 300 performs a selected operation at a selected point in time in response to a signal transmitted from the second space ground station 200-2. Meanwhile, after transmitting the control signal to the artificial satellite 300, the second space ground station 200-2 may malfunction and accordingly, may fail in communicating with the artificial satellite 300 or the management apparatus 100 or may fail in processing data from the artificial satellite 300. If the artificial satellite 300 is incapable of storing data for a long period of time, such as a CubeSat, such malfunction of the second space ground station 200-2 may lead to missing of satellite data. To prevent this, the management apparatus 100 may periodically or aperiodically monitor a state of the second space ground station 200-2. If the second space ground station 200-2 is determined to malfunction, the management apparatus 100 may select another space ground station, for example, the third space ground station 200-3, such that the selected third space ground station 200-3 may replace the second space ground station 200-2. In response to a selection on the third space ground station 200-3, the management apparatus 100 may transmit a control signal (e.g., a control signal to receive data from the artificial satellite 300) to the selected third space ground station 200-3. In response to receiving the control signal transmitted from the management apparatus 100, the third space ground station 200-3 may generate a data transmission request signal (e.g., a signal instructing to transmit data to the third space ground station 200-3 after a current point in time), and may transmit the data transmission request signal to the selected artificial satellite 300. The artificial satellite 300 may transmit satellite data to the newly selected third space ground station 200-3, instead of transmitting the satellite data to the existing second space ground station 200-2. The third space ground station 200-3 may transmit the received satellite data to the management apparatus 100 by processing or not processing the satellite data. Accordingly, the satellite data may be forwarded to the user without being lost.

Hereinafter, a satellite operation service management method according to an example embodiment is described with reference to FIG. 10.

Figure 10:
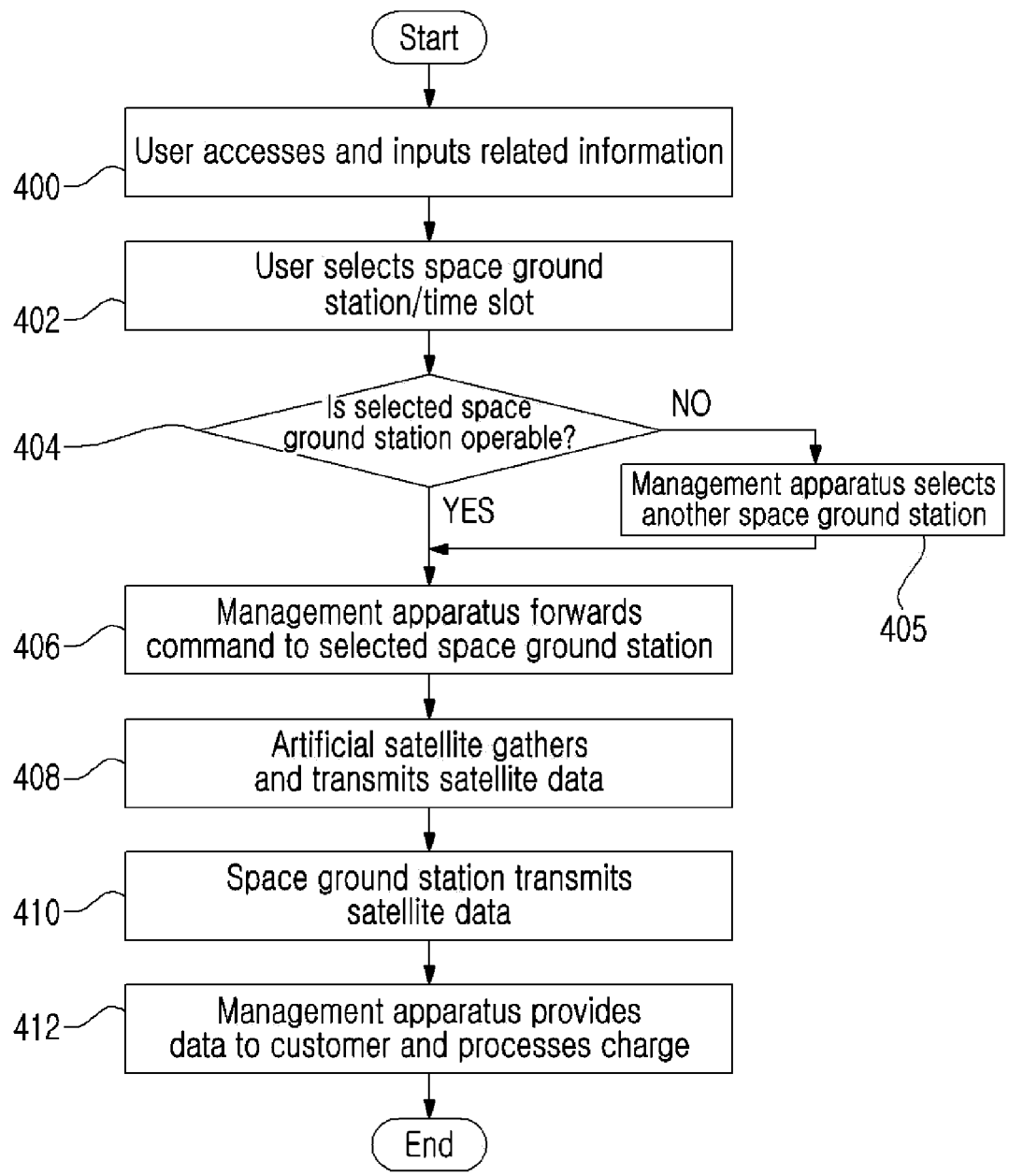
FIG. 10 is a flowchart illustrating an example of a satellite operation service management method according to an example embodiment.

FIG. 10 is a flowchart illustrating an example of a satellite operation service management method according to an example embodiment.

Referring to FIG. 10, in operation 400, a user may access a management apparatus and may input information related to a task or management of an artificial satellite and a space ground station to a management apparatus using a terminal. Here, information input from the user may include, for example, identification information of the user, identification information of an artificial satellite to be used by the user, orbit information of the artificial satellite and/or trajectory information of a launch vehicle. In this case, the artificial satellite to be used by the user may also be determined.

In response to the access of the user, the management apparatus may provide information about a space ground station available for the user, a time slot of each space ground station and/or an occupancy state of a time slot or related data through a web or a separate application. In operation 402, the user may select and input the space ground station and/or a use time (i.e., a time slot) of the space ground station based on the received information or related information. In this case, the management apparatus may allow the user to select only an unoccupied time slot and not to select an occupied time slot.

The user may select a space ground station that includes a time slot in a desired time zone based on information about the space ground station and/or time slot forwarded from the management apparatus and a relevant user interface (e.g., a graphics user interface), and may select and input a desired operation time of the selected space ground station. Information of the selected space ground station and time slot is forwarded to the management apparatus.

In operation 404, the management apparatus may determine whether the space ground station selected by the user is operable before transmitting a control signal to the space ground station. If the space ground station selected by the user is inoperable due to a communication malfunction or a failure of a control system (NO in 404), the management apparatus may select another space ground station based on a selection from the user or a predetermined standard in operation 405. Here, the selected other space ground station may include a space ground station capable of communicating with an artificial satellite to be used for acquiring satellite data, such as, for example, a space ground station present around the selected space ground station or a space ground station present in an area below or around the orbit of the artificial satellite.

In operation 406, the management apparatus may forward a signal (e.g., time slot data) related to an operation of the artificial satellite or the space ground station to the selected space ground station. Depending on example embodiments, the management apparatus may be designed to transmit a signal related to an operation of the artificial satellite or the space ground station if the space ground station selected by the user is operable (YES in operation 404) or if selection of the other space ground station is completed in operation 405.

In operation 408, the space ground station receiving the signal may control an artificial satellite corresponding to the signal transmitted from the management apparatus, and the artificial satellite may perform an operation requested by the user to gather satellite data at a point in time corresponding to a time slot selected by the user under control of the space ground station. The data gathered by the artificial satellite may be transmitted to the same space ground station. Here, the gathered satellite data may include, for example, an image captured from the ground surface. Depending on example embodiments, if the selected space ground station malfunctions, another space ground station different from the selected space ground station may transmit a data transmission request to the artificial satellite. In response thereto, the artificial satellite may transmit the satellite data to the other space ground station. In this case, under the control of the management apparatus, the other space ground station may generate the data transmission signal for the artificial satellite.

In operation 410, in response to receiving the satellite data, the space ground station may transmit the received satellite data or data corresponding thereto to the management apparatus. If necessary, the space ground station may further perform predetermined processing, for example, image processing, of the received satellite data and then transmit the processed satellite data to the management apparatus.

In operation 412, the management apparatus may receive the satellite data or data corresponding thereto from the space ground station, and may forward the received data to the terminal. The user, for example, a customer may verify the satellite data through the terminal. In addition, the management apparatus may calculate system use cost and may bill the customer for the calculated system use cost. In operation 412, the management apparatus may calculate the system use cost using a variety of methods based on a selection of a designer and may bill the customer for the cost using a variety of methods. For example, the management apparatus may charge the customer for the service use immediately or at predetermined periods.

The satellite operation service management method according to the example embodiments may be implemented in a form of a program executable by a computer apparatus. For example, the program may include, alone or in combination with program instructions, data files, data structures, and the like. The program may be designed and manufactured using a machine code or a higher level code. The program may be specially designed to implement the satellite operation service management method and may be implemented using functions or definitions well-known and available to those skilled in the computer software arts. Also, a computer apparatus may include a processor, a memory, and the like to implement functions of the program, and, if necessary, may further include a communication apparatus.

The program for implementing the satellite operation service management method may be recorded in non-transitory computer-readable media. Examples of the non-transitory computer-readable media may include magnetic media such as hard discs and floppy discs; optical media such as magnetic tapes, CD-ROM discs and DVDs; magneto-optical media such as floptical discs; and hardware apparatus that are specially configured to store and perform a specific program executed in response to call of a computer, such as semiconductor storage devices, for example, ROM, RAM, flash memory, and the like.

A number of example embodiments regarding the satellite operation service management system, the satellite operation service management apparatus, and the satellite operation service management method have been described above. Nonetheless, it should be understood that various modifications may be made to these example embodiments. For example, various apparatuses or methods achieved by one of ordinary skill in the art through alterations and modifications thereto may be an example embodiment of the aforementioned satellite operation service management system, satellite operation service management apparatus, and satellite operation service management method. For example, suitable results may be achieved if the described techniques are performed in a different order and/or if components in a described system, architecture, apparatus, or circuit are combined in a different manner and/or replaced or supplemented by other components or their equivalents. Accordingly, other implementations are still within the scope of the following claims.

What is claimed is:

1. A satellite operation service management apparatus comprising:
   a processor configured to
      receive, from a user terminal device, task information indicating a content of a task to be performed by a user of the user terminal,
      determine, based on the received task information, an optimal artificial satellite among a plurality of artificial satellites,
      provide, to the user terminal device, information indicating available space ground stations that are configured to associate with the determined artificial satellite, and information indicating time slots assigned to the available space ground stations,
      receive, from the user terminal device, a user input selecting at least one time slot,
      select a space ground station which corresponds to the selected at least one time slot and is to be used for controlling the determined artificial satellite,
      generate, based on the selected space ground station and the selected at least one time slot, a control signal for controlling the selected space ground station, and
   transmit the generated control signal to the selected space ground station,
   wherein the selected at least one time slot is a time zone allocated to each of a plurality of space ground stations or a lower time zone included in the allocated time zone to allow the plurality of space ground stations to share a single artificial satellite or at least two artificial satellites.

2. The satellite operation service management apparatus of claim 1, wherein the processor is further to transmit, to the user terminal, the information indicating the available space ground stations, which are selected from a set including an identification symbol, a position, and operation state information and time slots of the available space ground stations.

3. The satellite operation service management apparatus of claim 2, wherein the processor is further configured to process an existing occupied time slot among the time slots of the available space ground stations to be non-selectable.

4. The satellite operation service management apparatus of claim 2, wherein the processor is further configured to
   receive, from the user terminal, a selection on the space ground station to be used and the time slot to be used by the space ground station, and
   determine the space ground station to be used and the time slot to be used by the space ground station in response to the selection.

5. The satellite operation service management apparatus of claim 4, wherein the processor is further configured to
   determine whether the space ground station to be used is operable, and
   select another space ground station to replace the space ground station to be used in response to inoperability of the space ground station to be used.

6. The satellite operation service management apparatus of claim 5, wherein the other space ground station is configured to transmit a control signal for an operation of the determined artificial satellite or a satellite data transmission request signal to the determined artificial satellite.

7. The satellite operation service management apparatus of claim 1, wherein the processor is further configured to process satellite data received from the selected space ground station.

8. The satellite operation service management apparatus of claim 1, wherein the processor is further configured to perform at least one of calculation, billing, and payment for system use cost.

9. The satellite operation service management apparatus of claim 1, wherein the processor is further configured to receive, from the user terminal device, a user input selecting dates, and receive a user input selecting time slots for each of the selected dates.

10. A satellite operation service management system comprising:
   a plurality of space ground stations including at least one space ground station configured to communicate with at least one artificial satellite;
   a user terminal configured to receive the user input selecting at least one time slot; and
   a satellite operation service management apparatus configured to
      receive, from the user terminal device, task information indicating a content of a task to be performed by a user of the user terminal,
      determine, based on the received task information, an optimal artificial satellite among a plurality of artificial satellites,
      provide, to the user terminal device, information indicating available space ground stations that are configured to associate with the determined artificial satellite, and information indicating time slots assigned to the available space ground stations,
      receive, from the user terminal device, a user input selecting at least one time slot,
      select a space ground station which corresponds to the selected at least one time slot and is to be used for controlling the determined artificial satellite, and
      generate, based on the selected space ground station and the selected at least one time slot, a control signal for controlling the selected space ground station,
   wherein the selected at least one time slot is a time zone allocated to each of the plurality of space ground stations or a lower time zone included in the allocated time zone to allow the plurality of space ground stations to share a single artificial satellite or at least two artificial satellites.

11. The satellite operation service management system of claim 10, wherein the satellite operation service management apparatus is further configured to receive, from the user terminal device, a user input selecting dates, and receive a user input selecting time slots for each of the selected dates.

12. A satellite operation service management method comprising:
receiving, by a satellite operation service management apparatus, from a user terminal device, task information indicating a content of a task to be performed by a user of the user terminal;
determining, by the satellite operation service management apparatus, based on the received task information, an optimal artificial satellite among a plurality of artificial satellites;
providing, by the satellite operation service management apparatus, to the user terminal device, information indicating available space ground stations that are configured to associate with the determined artificial satellite, and information indicating time slots assigned to the available space ground stations;
receiving, by the satellite operation service management apparatus, from the user terminal device, a user input selecting at least one time slot;
selecting, by the satellite operation service management apparatus, a space ground station which corresponds to the selected at least one time slot and is to be used for controlling the determined artificial satellite;
generating, by the satellite operation service management apparatus, based on the selected space ground station and the selected at least one time slot, a control signal for controlling the selected space ground station; and
transmitting, by the satellite operation service management apparatus, the generated control signal to the selected space ground station,
wherein the selected at least one time slot is a time zone allocated to each of a plurality of space ground stations or a lower time zone included in the allocated time zone to allow the plurality of space ground stations to share at least one artificial satellite or at least two artificial satellites.

13. The satellite operation service management method of claim 12, further comprising:
transmitting, by the satellite operation service management apparatus, to the user terminal, the information indicating the available space ground stations, which are selected from a set including an identification symbol, a position, and operation state information and time slots of the available space ground stations.

14. The satellite operation service management method of claim 13, further comprising:
processing, by the satellite operation service management apparatus, an existing occupied time slot among the time slots of the available space ground stations to be non-selectable.

15. The satellite operation service management method of claim 13, further comprising:
receiving, by the satellite operation service management apparatus, from the user terminal, a selection on the space ground station to be used and the time slot to be used by the space ground station.

16. The satellite operation service management method of claim 15, further comprising:
determining, by the satellite operation service management apparatus, whether the space ground station to be used is operable; and
selecting, by the satellite operation service management apparatus, another space ground station to replace the space ground station to be used in response to inoperability of the space ground station to be used.

17. The satellite operation service management method of claim 16, further comprising:
transmitting, by the satellite operation service management apparatus, a control signal for an operation of the determined artificial satellite or a satellite data transmission request signal to the determined artificial satellite.

18. The satellite operation service management method of claim 13, further comprising:
transmitting, by the satellite operation service management apparatus, satellite data received from the space ground station to the user terminal.

19. The satellite operation service management method of claim 18, further comprising:
performing, by the satellite operation service management apparatus, at least one of calculation, billing, and payment for system use cost after transmitting the satellite data.

20. The satellite operation service management method of claim 12, further comprising:
receiving, from the user terminal device, a user input selecting dates, and receiving a user input selecting time slots for each of the selected dates.

* * * * *